Oct. 22, 1957 W. E. GEORGE ET AL 2,810,293
SLOW SPEED DRIVE TRACTOR ATTACHMENT
Filed April 11, 1956 2 Sheets-Sheet 1

Inventors
WARREN E. GEORGE
GLENN W. McININCH
Carlson, Pitzner, Hubbard & Wolfe
Attys.

Oct. 22, 1957   W. E. GEORGE ET AL   2,810,293
SLOW SPEED DRIVE TRACTOR ATTACHMENT
Filed April 11, 1956                                2 Sheets-Sheet 2
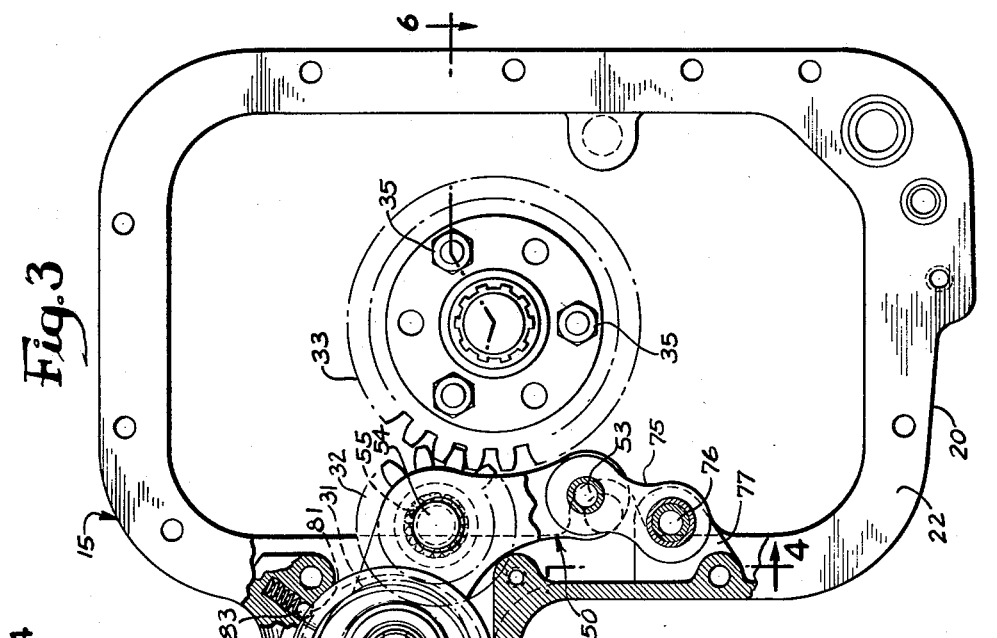
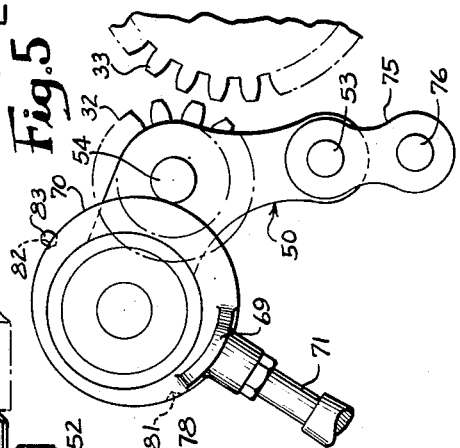
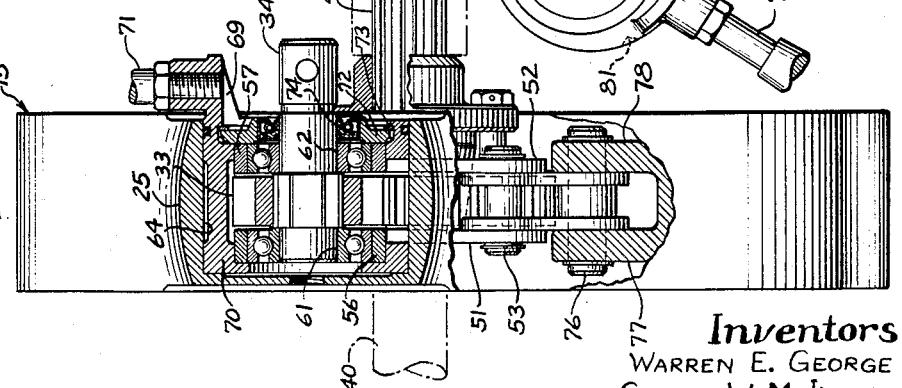
Inventors
WARREN E. GEORGE
GLENN W. McININCH
by: Carlson, Pitzner, Hubbard & Wolfe
Attys.

United States Patent Office 2,810,293
Patented Oct. 22, 1957

2,810,293

SLOW SPEED DRIVE TRACTOR ATTACHMENT

Warren E. George, Auburn, and Glenn W. McIninch, Omaha, Nebr., assignors to Auburn Machine Works, Inc., Auburn, Nebr., a corporation of Nebraska Application April 11, 1956, Serial No. 577,485

8 Claims. (Cl. 74—15.88)

The present invention relates to a tractor attachment for permitting slow speed drive of the tractor, and more particularly to an improved mechanism for conducting power to the tractor drive shaft to obtain the slow crawling speed required for trenching and similar operations.

When utilized in a trenching operation a tractor must deliver high torque at an extremely slow rate of forward speed; the speed being measured in inches per minute. Since the normal tractor transmission cannot accomplish the desired speed reduction, it has been proposed to drive the tractor through its power take-off mechanism. Power from the power take-off is led through a speed reduction unit and is thereafter conducted to the tractor drive shaft. During trenching operations the trencher occasionally encounters underground obstructions. The forward motion of the tractor is then abruptly halted and the driving gear train is locked or tightly jammed between the engine force and the resistance of the obstruction. In the common power take-off arrangement it is not usually possible to reverse the power input to the gear train and thereby release the loaded gears, and it therefore becomes necessary to break the driving gear train while it is under a heavy load with the gears tightly locked together. In the past it has been necessary to resort to complicated unlocking arrangements to relieve this condition.

It is an object of the invention to provide a novel power disconnect device which affords a positive geared connection between the power take-off of the tractor and the tractor drive shaft that will permit disengagement of the gearing when the gearing is tightly jammed or "locked-up" following the striking of an obstruction by fingertip shifting of a conveniently located handle.

It is a related object to provide a power disconnect device which is a compact, self-contained unit that does not require any redesign or modification of the tractor and which will not interfere with normal tractor operation. It is a more detailed object to provide a device of the above type which has a minimum number of parts, is trouble free and has an inherently long life. It is a resulting object to provide a power disconnect unit which is much less costly than devices previously employed for the purpose.

In one of its aspects it is an object to provide a power disconnect device which can be entirely disengaged from the tractor's drive shaft so that during normal tractor operation there are no engaged moving parts to cause undesirable noise or "chatter."

Other objects and advantages of the invention will become apparent upon reading the following detailed discussion and upon reference to the attached drawings in which:

Fig. 3 is an end view of the power disconnect device shown in partial section.

Fig. 4 is a vertical section taken along line 4—4 in Fig. 3.

Fig. 5 is a partial side view of the structure shown in Fig. 3 with the gears in their disconnected position.

While the invention will be described in connection with a preferred embodiment, it will be understood that we do not intend to limit the invention to that embodiment but, on the contrary intend to cover such alternative embodiments and constructions as may be included within the spirit and scope of the appended claims.

Figure 1:
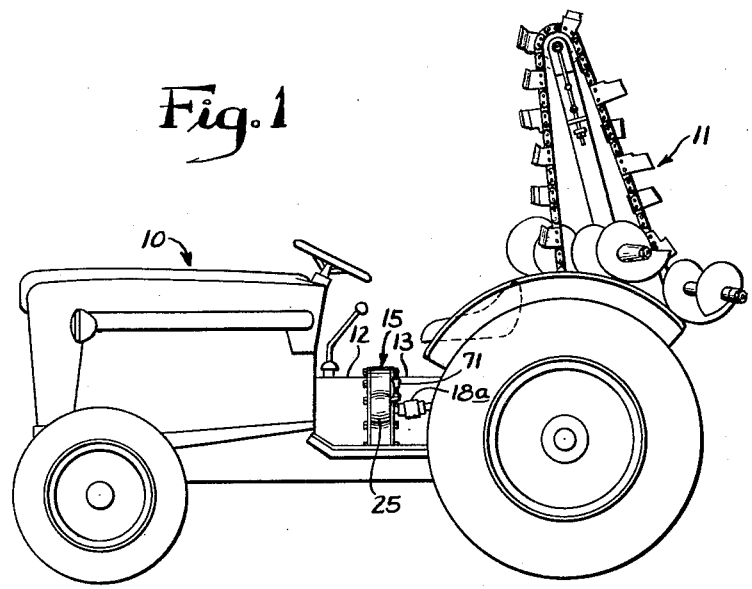
Figure 1 is an elevation of a tractor, carrying a trenching attachment, which embodies the present invention.
Figure 2:
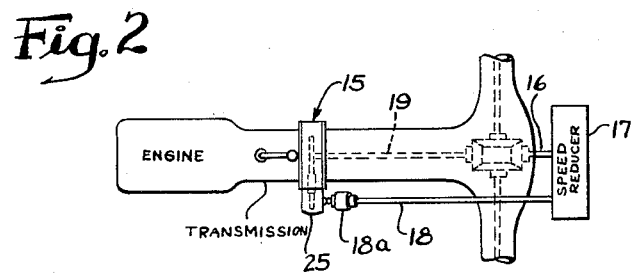
Fig. 2 is a schematic plan view of the construction showing the driving power train.

Turning now to Fig. 1 there is shown a tractor 10 carrying a trench digging attachment 11. Installed behind the transmission housing 12 of the tractor is a power disconnect device 15 constructed in accordance with the present invention. When the trencher is in operation it is desired to drive the tractor at a slow crawling speed. This is accomplished by utilizing the power train shown schematically in Fig. 2. As set forth in this figure the power take-off indicated at 16 is coupled to a speed reduction unit 17 positioned adjacent thereto. The power output of the speed reduction unit is led forwardly by a shaft 18 coupled through a universal joint 18a to the power disconnect device 15. Within the latter device step-down gearing is provided for coupling the power input to the tractor drive shaft 19. In operation, the tractor transmission is shifted into neutral and power is supplied to the power take-off. The speed of rotation is decreased, with an increase in torque, through the speed reduction unit and again through the gearing in the power disconnect device so that the tractor drive shaft is slowly, but powerfully, rotated, driving the tractor ahead as a rate of speed measured in inches per minute.

Figure 6:
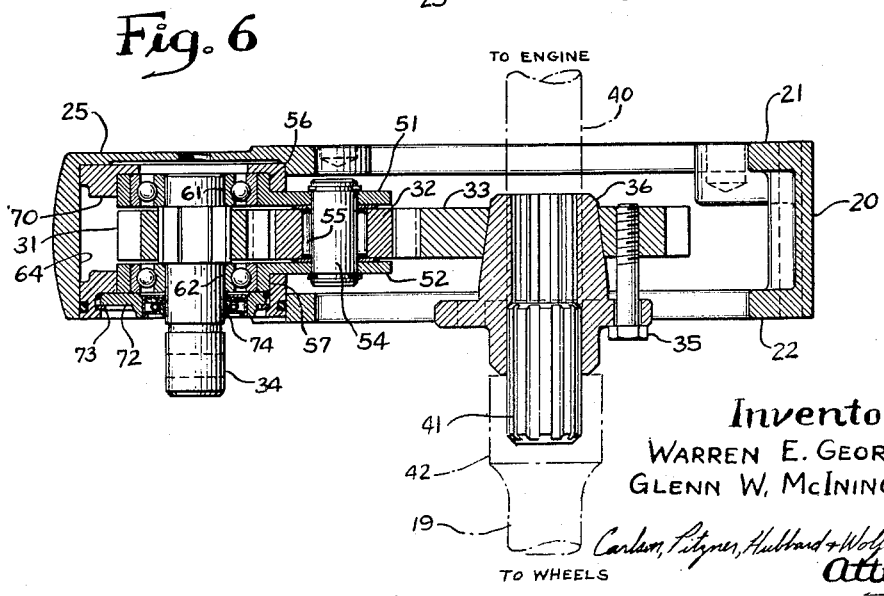
Fig. 6 is a transverse section taken along line 6—6 in Fig. 3.

Referring to the power disconnect device more particularly it can be seen in Figs. 3, 4 and 6 that is comprises an enclosing frame 20 of generally rectangular shape having opposed parallel flanges 21, 22 which adapt it to be sandwiched between the separable portions 12, 13 of the tractor body which house the normal tractor driving mechanism. The frame is bolted securely in place using the bolt holes already provided in the tractor body portions so that the strength and integrity of the tractor are not impaired. The frame generally conforms to the shape of the housing members to which it is secured, except for the outboard protrusion 25 which is alined with the input shaft 18.

For the purpose of transmitting power from the input shaft 18 to the drive shaft 19, a train of three meshed gears are provided including an input gear 31, an idler gear 32 and a driving gear 33. The input gear is fixed to a stub shaft 34 which is adapted to be secured, as by the universal coupling 18a shown in Figs 1 and 2, to the shaft 18 extending forwardly from the speed reduction unit. The input gear 31 is constantly in mesh with the intermediate or idler gear 32 which is adapted to engage the driving gear 33. The driving gear is secured, as by cap screws 35 to a tapered hub 36. The forward portion of the hub 36 is splined to receive the splined transmission or input shaft 40 in the tractor. The rear portion of the hub carries a splined stub projection 41 which is received in a socket 42 normally provided on the forward end of the drive shaft 19. Thus it will be seen that the hub 36 and its splined stubshaft 41 together provide a strong and positive coupling between the separated ends 40 and 42 of the tractor driving shafts.

In accordance with the present invention means are provided for breaking the driving gear train even when the gears are tightly jammed or locked under load, by swinging one gear of a meshed pair radially away from the other with no sliding movement in an axial direction. In the present embodiment this is accomplished by mounting the input gearing comprising the meshing input and idler gears, in a pivoted bracket 50 and by providing means for swinging the bracket about its pivot. The bracket is formed of two generally L-shaped members 51, 52 which are pivoted at their lower ends on a pivot pin 53. Snap rings are provided to hold the members on the pin. To carry the idler gear 32 the bracket is provided with a pin 54 held in place with snap rings. The idler gear rotates on suitable roller bearings 55.

In order to carry the input gear 31 the bracket members are provided with outwardly extending flange portions 56, 57 shown in Figs. 4 and 6. Telescoped within the flange portions are ball bearing assemblies 61, 62 which support the stub shaft 34 upon which the input gear is splined. As can readily be seen in the drawings the pin 54 and the stub shaft 34 are positioned in the bracket 50 so that the input gear 31 and the idler gear 32 are constantly in mesh.

For the purpose of swinging the bracket about its pivot pin an eccentric mechanism having an operating handle is provided. In the present construction the protrusion 25 on the frame is formed in cup shape providing a rearwardly facing cylindrical recess 64, and an eccentric sleeve 70 is telescoped therein for the purpose of carrying the flanges 56, 57 of the supporting bracket 50. The operating handle indicated at 71 is mounted on a boss 69 formed on the rear end of the eccentric and extending through the opening in the rear of the frame protrusion, as shown in Fig. 4. The handle is therefore conveniently located for rotation of the eccentric as can be seen in Fig. 1.

To hold the bracket assembly within the inner cylindrical recess of the eccentric a seal ring 72 is provided which is held in place by a snap ring 73. A seal 74 in the seal ring surrounds the stub shaft to prevent lubricant from escaping. It is therefore apparent that when the handle is swung counterclockwise in Fig. 3 the inner cylindrical surface of the eccentric which surrounds the bracket flanges 56, 57 is carried up and to the left in that figure thereby swinging the bracket 50 about its pivot pin 53 and moving the idler gear 32 radially out of engagement with the driving gear 33.

It is noted that the eccentric imparts motion to the end of the bracket in two directions. That is, when the handle in Fig. 3 is moved counterclockwise the bracket end carried by the eccentric is moved up as well as to the left. In order to permit this motion having two components, a compound pivot is provided for the bottom of the bracket. In this embodiment the bracket pivot pin 53 is carried by a link 75 which in turn is pivoted on a pin 76 within bosses 77, 78 formed on the interior of the frame as shown in Fig. 4. Thus, when the eccentric is rotated to swing the bracket for separation of the meshing gears, the link 75 and bracket 50 can straighten up from the slightly jackknifed position shown in Fig. 3 to the more elongated position shown in Fig. 5 thereby compensating for the upward component of movement imparted to the bracket by the eccentric.

In order to positively locate the eccentric in its two desired positions, the outer cylindrical surface has formed therein two detent depressions 81, 82. A spring urged detent 83, mounted in the frame, as shown in Fig. 3, is designed to nest in the depression 81 when the gears are in mesh and to nest in the depression 82 when the gears are uncoupled.

It is to be noted that when the gears are disengaged there are no parts engaging the drive shaft assembly to idly rotate when the drive shaft functions during normal tractor operation. This, of course, eliminates any possibility of noise or "chatter" in the power disconnect mechanism when the device is not in use, as for example during high speed transport.

While the operation of the device will be apparent from the foregoing description, it will be helpful to briefly summarize the essential features of its operation. It will be appreciated that when this device is in use during a trench digging operation the extremely high ratio of gear reduction produces a very slow tractor speed and develops an extremely high potential torque. When the trench digging blades strike an obstruction, therefore, the tractor continues to press forward with great force until the operator senses that the engine is laboring and he stops the drive, or, if the operator cannot act rapidly enough, until the engine stalls. In either case the driving train is then under high torque loads with all of the meshing gears being tightly locked or jammed together. This condition can obviously be relieved by reversing the rotation of the power source, but in conventional tractors the power take-off rotates in only one direction. It therefore becomes necessary to break the locked gear train so that the tractor can be backed off from the obstruction.

To unlock the present device, light manual effort is applied by the tractor operator to the conveniently located handle 71 to move the same from the engaged position shown in Fig. 3 to the disengaged position shown in Fig. 5. Only a light pressure is required since the gears are separated in a radial direction and since the eccentric provides a high degree of mechanical advantage.

As a result of the disengagement between the drive shaft 19 and the slow speed driving train, the operator may put the regular transmission into reverse and engage the clutch in order to back the tractor and thus the trenching blade away from the obstruction. After the obstruction has been cleared, the present device may be reengaged and trench digging resumed. This arrangement is thus to be contrasted to arrangements wherein gears must be slid against each other in an axial direction in order to separate them.

We claim as our invention:

1. For use with a tractor having a speed-reducing mechanism operated from the tractor power take-off, and having a separable body and drive shaft, a power disconnect mechanism comprising in combination a frame presenting parallel flanges at its opposite ends adapted to be sandwiched between the separated body portions of the tractor to form a rigid and integral unit therewith, said frame enclosing a spur gear on the drive shaft, input gearing including an input gear and an idler gear, said idler gear being mounted in said frame in a position outboard of the tractor body for driving by the tractor speed-reducing mechanism, said input gear being normally coupled through said idler gear to the gear on the drive shaft to establish a creeping drive, bearings for supporting said input and idler gears, an eccentric collar interposed between said frame and one of said bearings, and means for rotating said collar, said eccentric being so arranged that upon rotation thereof the gearing is unmeshed by relative radial movement for disconnecting the driving train.

2. For use with a tractor having a speed-reducing mechanism operated from the tractor power takeoff, and having a separable body and drive shaft, a power disconnect mechanism comprising in combination a frame presenting parallel flanges at its opposite ends adapted to be sandwiched between the separated body portions of the tractor to form a rigid and integral unit therewith, said frame enclosing a spur gear on the drive shaft, input gearing including an input gear mounted in said frame in a position outboard of the tractor body for driving by the tractor speed-reducing mechanism, said input gearing being normally coupled to the gear on the drive shaft to establish a creeping drive, a bearing supporting the input gear, and an eccentric collar mounted for rotation in said frame surrounding and supporting the bearing for unmeshing the gearing by imparting relative radial movement to at least one of the gears.

3. For use with a tractor having a speed-reducing mechanism operated from the tractor power take-off, and having a separable body and drive shaft, a power disconnect mechanism comprising in combination a frame presenting parallel flanges at its opposite ends adapted to be sandwiched between the separated body portions of the tractor to form a rigid and integral unit therewith, said frame enclosing a spur gear on the drive shaft and having a cup-like protrusion extending outwardly with its opening rim being parallel to said flanges, input gearing including an input gear mounted in said cup-like protrusion of the frame outboard of the tractor body for driving by the tractor speed-reducing mechanism, said input gearing being normally coupled to the gear on the drive shaft to establish a creeping drive, and means for unmeshing the gearing by relative radial movement of at least one of the gears.

4. For use with a tractor having a speed-reducing mechanism operated from the tractor power takeoff, and having a separable body and drive shaft, a power disconnect mechanism comprising in combination a frame presenting parallel flanges at its opposite ends adapted to be sandwiched between the separated body portions of the tractor to form a rigid and integral unit therewith, said frame enclosing a spur gear on the drive shaft and having a cup-like protrusion extending outwardly with its opening rim being parallel to said flanges, input gearing including an input gear mounted in said cup-like protrusion of the frame in a position outboard of the tractor body for driving by the tractor speed-reducing mechanism, said input gearing being normally coupled to the gear on the drive shaft to establish a creeping drive, a bearing supporting the input gear, an eccentric collar surrounding and supporting said bearing mounted for rotation within said cup-like protrusion for imparting relative radial movement to said input gear for unmeshing said gearing, and a handle fixed to the eccentric collar extending through and over said rim of the cup-like protrusion on the frame.

5. For use with a tractor having a speed-reducing mechanism operated from the tractor power takeoff, and having a separable body and drive shaft, a power disconnect mechanism comprising in combination a frame presenting parallel flanges at its opposite ends adapted to be sandwiched between the separated body portions of the tractor to form a rigid and integral unit therewith, said frame enclosing a spur gear on the drive shaft, input gearing including an input gear mounted in said frame in a position outboard of the tractor body for driving by the tractor speed-reducing mechanism and an idler gear in mesh with the input gear and adapted to engage the spur gear, said input gearing being normally coupled to the spur gear on the drive shaft to establish a creeping drive, and means associated with said input gear for unmeshing the gearing by radial bodily movement of both the input and idler gears from the spur gear.

6. For use with a tractor having a speed-reducing mechanism operated from the tractor power takeoff, and having a separable body and drive shaft, a power disconnect mechanism comprising in combination a frame presenting parallel flanges at its opposite ends adapted to be sandwiched between the separated body portions of the tractor to form a rigid and integral unit therewith, said frame enclosing a spur gear on the drive shaft, a link pivoted within said frame, an elongated bracket pivoted at one end to said link and having an annular flange at its other end, input gearing carried by said bracket including an input gear positioned in said frame by said bracket outboard of the tractor body for driving by the tractor speed-reducing mechanism, said input gearing being normally coupled to the gear on the drive shaft to establish a creeping drive, an eccentric collar surrounding said flange and thereby supporting said bracket for unmeshing the gearing by swinging said bracket and said link about their pivots thereby imparting relative radial movement to at least one of the gears.

7. For use with a tractor having a speed-reducing mechanism operated from the tractor power take-off and having a drive shaft and drive shaft gearing together with a clutch for disengaging the same from the engine, the combination comprising a frame, input gearing including an input gear mounted in said frame in a position outboard of the tractor body for driving by the tractor speed-reducing mechanism, at least one gear in said input gearing being movable between a first position in which the input gearing is meshed with the drive shaft gearing to establish a creeping drive and a second position in which the input gearing is unmeshed from the drive shaft gearing, and means including an eccentric for shifting the movable input gearing between the said two positions along a path of movement which is substantially radial with respect to the unmeshed gears.

8. For use with a tractor having a speed-reducing mechanism operated from the tractor power take-off, and having a drive shaft and drive shaft gearing together with a clutch for disengaging the same from the engine, the combination comprising a frame, input gearing including an input gear mounted in said frame in a position outboard of the tractor body for driving by the tractor speed-reducing mechanism, at least one gear in said input gearing being movable between a first position in which the input gearing is meshed with the drive shaft gearing to establish a creeping drive, and a second position in which the input gearing is unmeshed from the drive shaft gearing, a bearing supporting a said movable gear, and an eccentric collar mounted for rotation in said frame surrounding and supporting the bearing for shifting the movable input gearing between the said two positions along a path of movement which is substantially radial with respect to the unmeshed gears.

References Cited in the file of this patent
UNITED STATES PATENTS
2,482,110    Hill _____ Sept. 20, 1949
FOREIGN PATENTS
185,781    Germany _____ Dec. 1, 1904